Figures 8, 9:
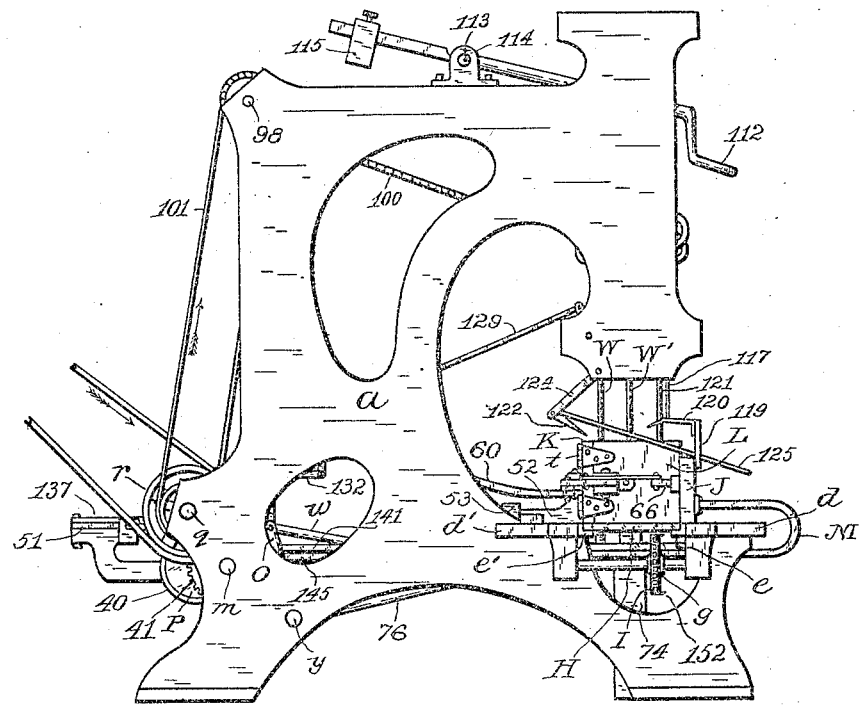

No. 830,726. PATENTED SEPT. 11, 1906.
A. C. KYNETT & E. D. TOOPS.
MACHINE FOR MAKING ARTIFICIAL STONE BLOCKS.
APPLICATION FILED OCT. 21, 1905.
7 SHEETS—SHEET 1.
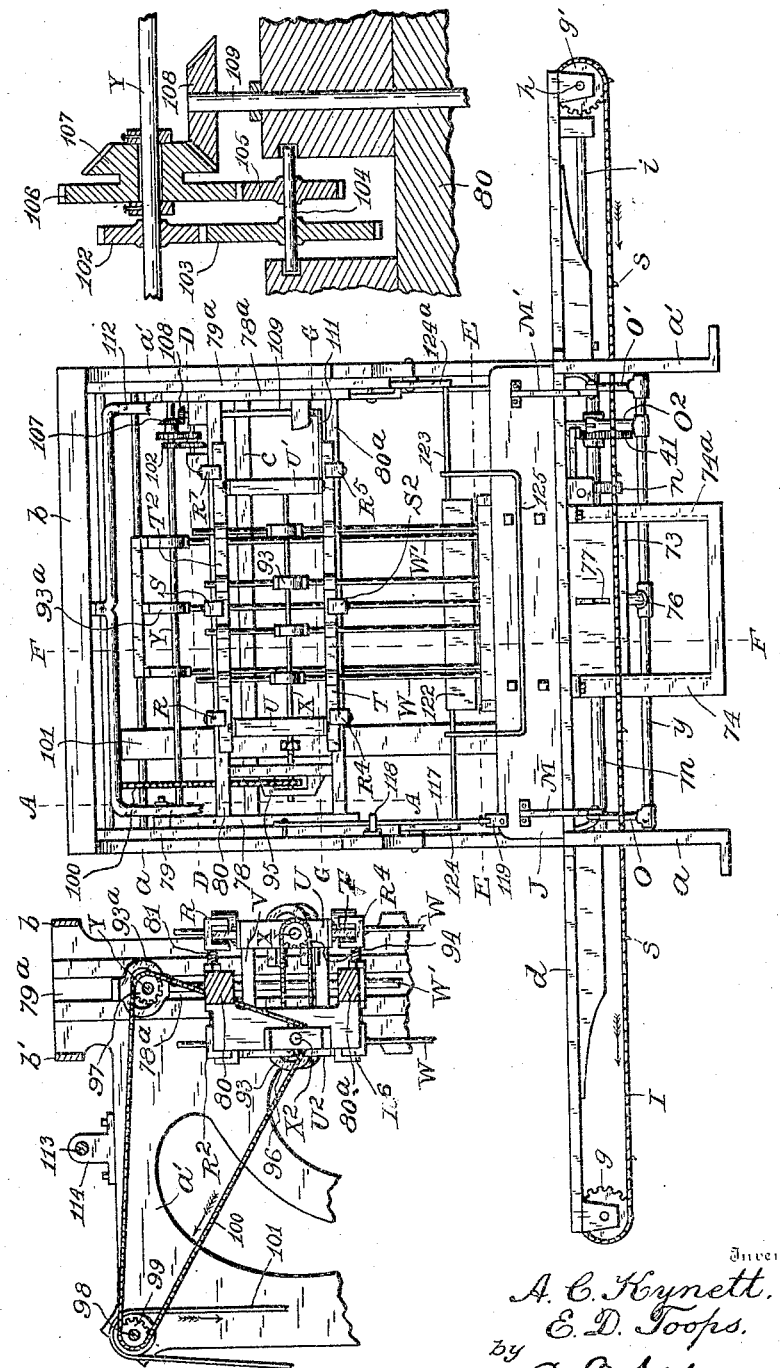
Witnesses:
E. R. Martin.
Stella Snider.
Inventors:
A. C. Kynett.
E. D. Toops.
by
E. T. Silvius,
Attorney.

No. 830,726. PATENTED SEPT. 11, 1906.
A. C. KYNETT & E. D. TOOPS.
MACHINE FOR MAKING ARTIFICIAL STONE BLOCKS.
APPLICATION FILED OCT. 21, 1905.
7 SHEETS—SHEET 2.
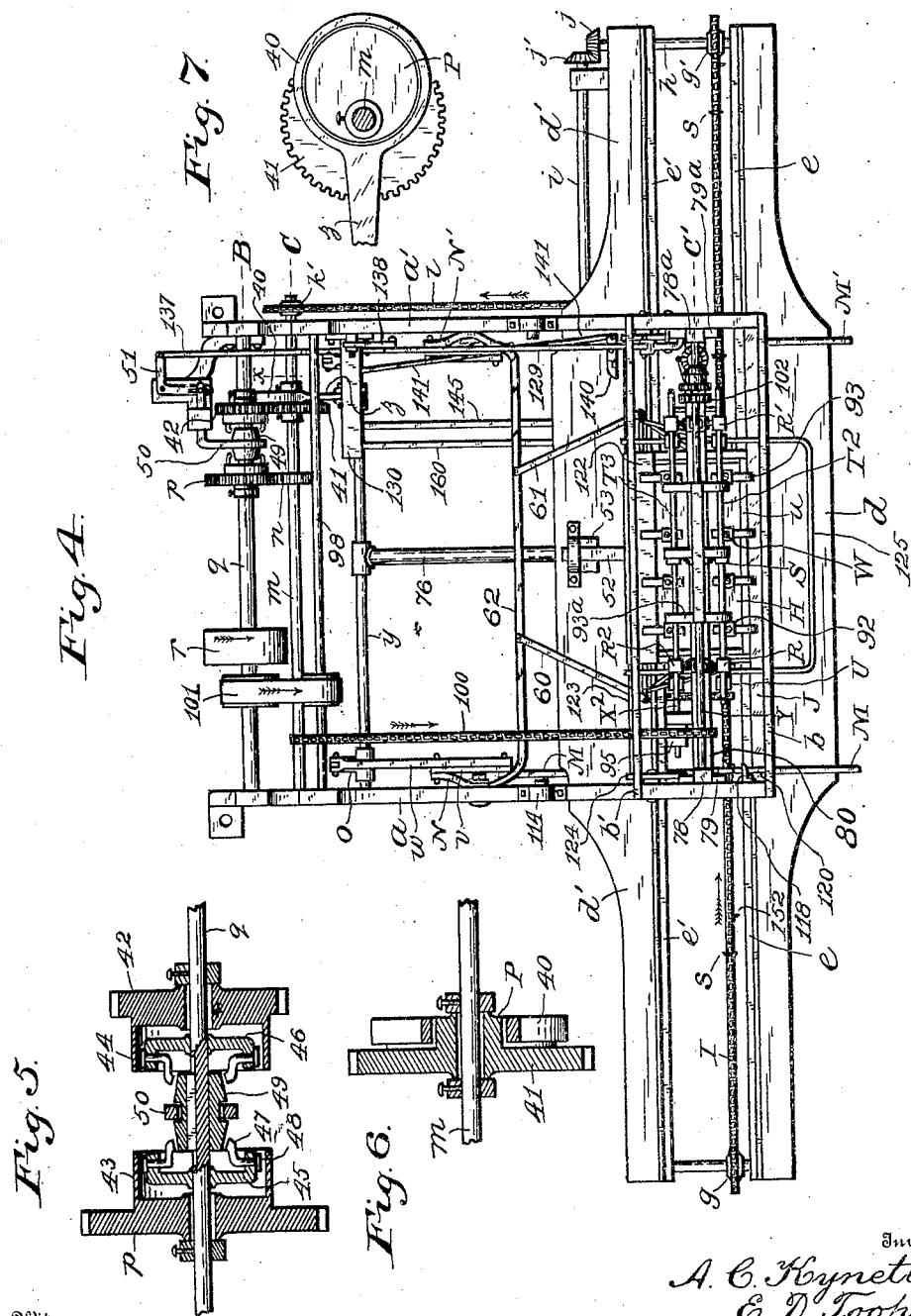
Witnesses:
E. Re Martin.
Stella Snider.
Inventors:
A. C. Kynett.
E. D. Toops.
by E. T. Silvius,
Attorney.

No. 830,726. PATENTED SEPT. 11, 1906.
A. C. KYNETT & E. D. TOOPS.
MACHINE FOR MAKING ARTIFICIAL STONE BLOCKS.
APPLICATION FILED OCT. 21, 1905.

7 SHEETS—SHEET 3.

Witnesses:
E. R. Martin.
Stella Snider.

Inventors:
A. C. Kynett.
E. D. Toops.
by E. T. Silvius.
Attorney.

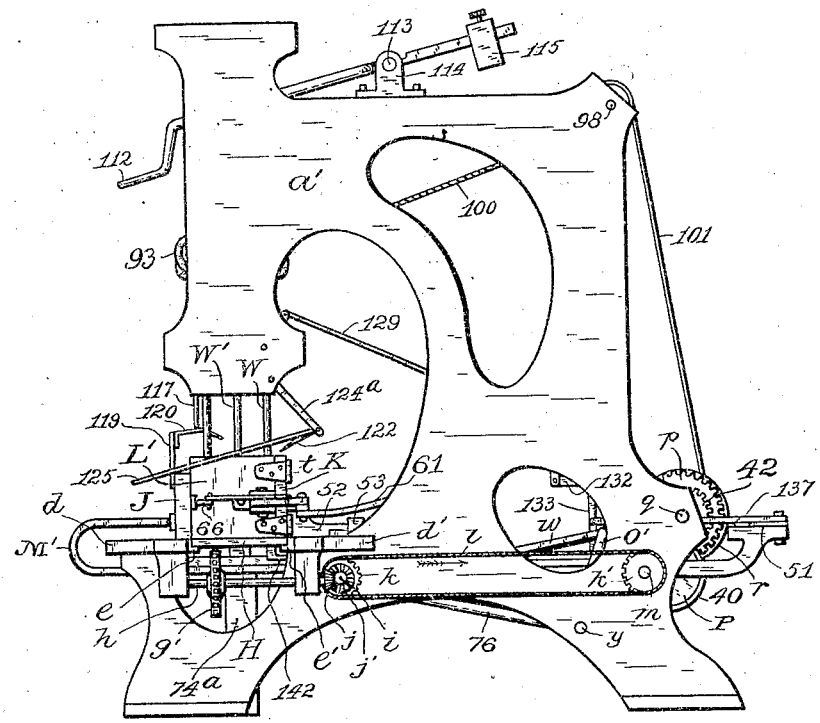

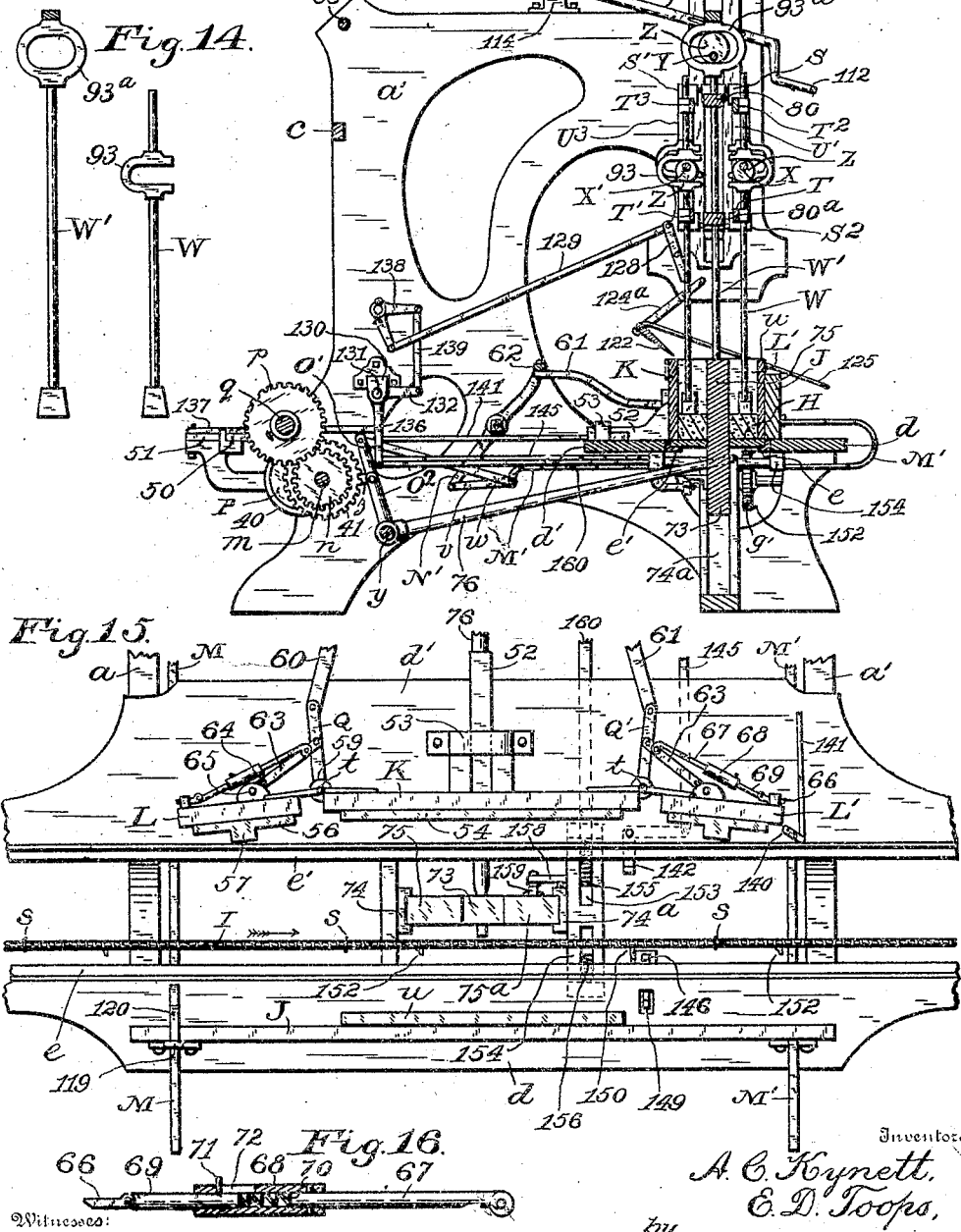

No. 830,726. PATENTED SEPT. 11, 1906.
A. C. KYNETT & E. D. TOOPS.
MACHINE FOR MAKING ARTIFICIAL STONE BLOCKS.
APPLICATION FILED OCT. 21, 1905.
7 SHEETS—SHEET 6.
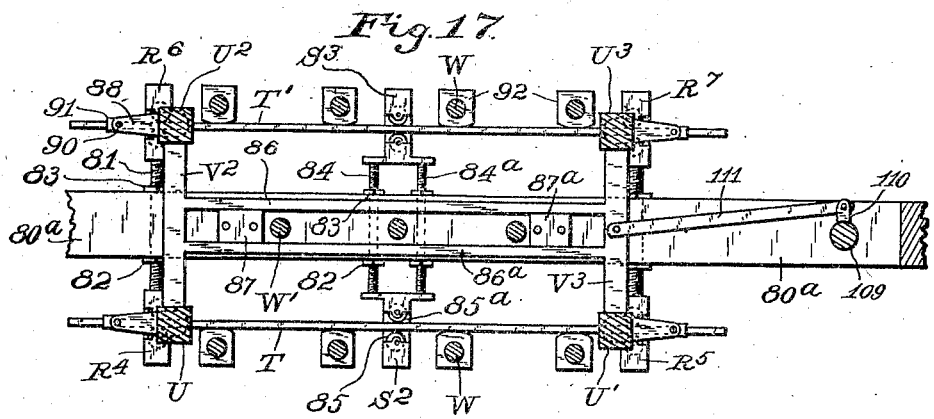
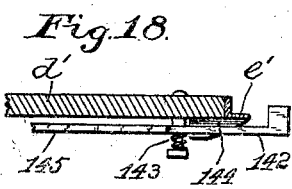
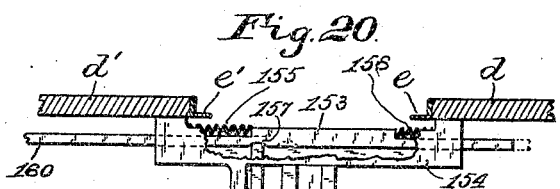
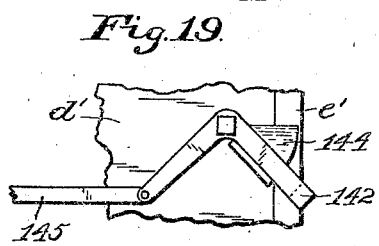
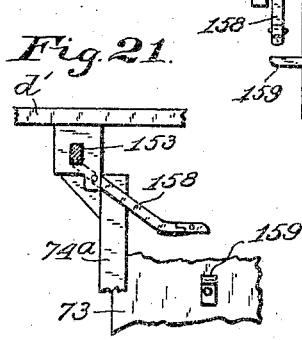
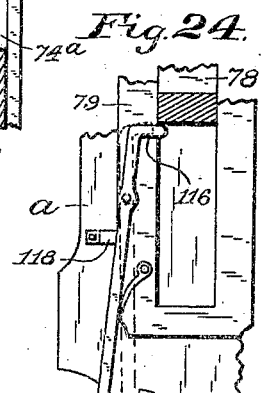
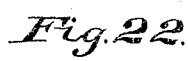
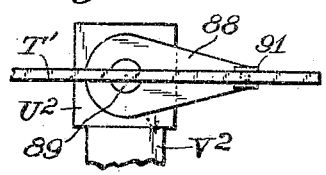
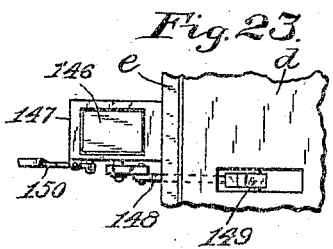
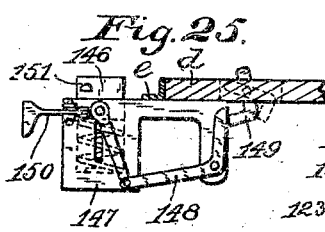
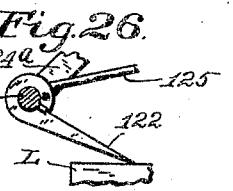
Witnesses:
E. E. Martin.
Stella Snider.
Inventors:
A. C. Kynett.
E. D. Toops.
by E. T. Silvius,
Attorney.

No. 830,726. PATENTED SEPT. 11, 1906.
A. C. KYNETT & E. D. TOOPS.
MACHINE FOR MAKING ARTIFICIAL STONE BLOCKS.
APPLICATION FILED OCT. 21, 1905.
7 SHEETS—SHEET 7.
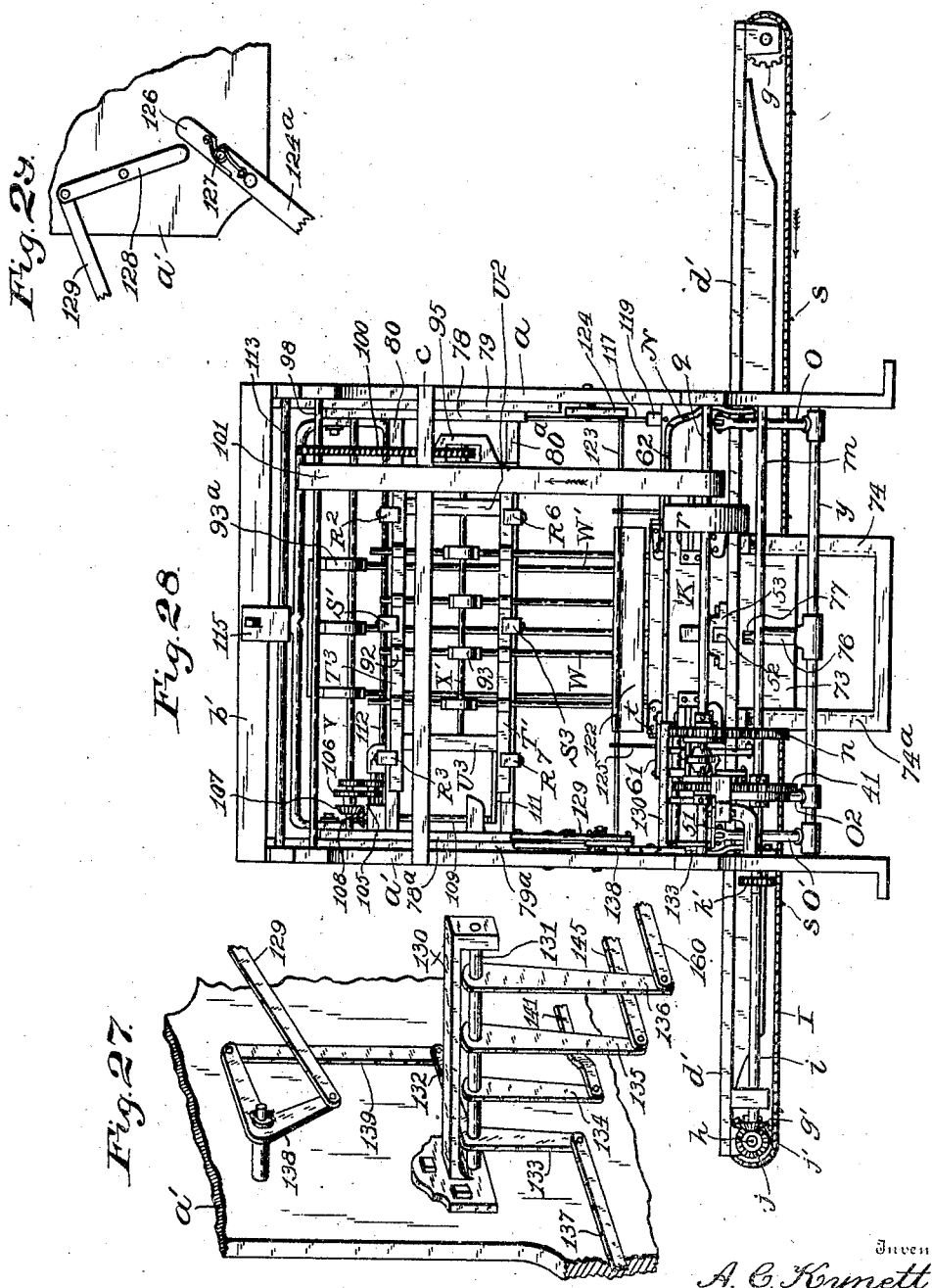
Witnesses:
E. G. Martin.
Stella Snider.
Inventors
A. C. Kynett,
E. D. Toops,
by
E. T. Silvius,
Attorney.

UNITED STATES PATENT OFFICE.

ATHOS C. KYNETT AND EMORY D. TOOPS, OF INDIANAPOLIS, INDIANA.

MACHINE FOR MAKING ARTIFICIAL-STONE BLOCKS.

No. 830,726.

Specification of Letters Patent.

Patented Sept. 11, 1906.

Application filed October 21, 1905. Serial No. 283,865.

*To all whom it may concern:*

Be it known that we, ATHOS C. KYNETT and EMORY D. TOOPS, citizens of the United States, residing at Indianapolis, in the county of Marion and State of Indiana, have invented new and useful Improvements in Machines for Making Artificial-Stone Blocks; and we do declare the following to be a full, clear, and exact description of the invention, reference being had to the accompanying drawings, and to the letters and figures of reference marked thereon, which form a part of this specification.

This invention relates to machines whereby concrete or artificial-stone blocks or bricks may be produced, the invention having reference more particularly to automatic power-machines of this class, and especially to the mold and pallets, the tamping apparatus, and the automatic mechanism thereof.

Objects of the invention are to provide machines whereby artificial-stone blocks may be formed of plastic material, such as cement and sand mixed with water, in an expeditious manner and economically and of superior quality; to provide machines of the above-mentioned character that may be relied on to properly tamp the plastic material in order to produce blocks of uniform quality, and to provide machines that may be operated by the minimum number of attendants.

The invention consists in a machine comprising an improved mold and means for operating the same, improved tamping apparatus and automatic mechanism for the operation thereof, and mechanism for removing the product from the mold; and the invention consists, further, in the novel parts and in the novel combinations and arrangements of parts, as hereinafter particularly described and claimed.

Referring to the drawings, Figure 1 is a front elevation of a machine constructed substantially in accordance with the invention; Fig. 2, a fragmentary vertical sectional view thereof on the line A A in Fig. 1; Fig. 3, a fragmentary sectional view of compound gearing that appears in the upper right-hand portion of Fig. 1 for operating the tamping apparatus, as at the line C' in Fig. 4; Fig. 4, a top plan of the machine in which parts are broken away; Fig. 5, a fragmentary sectional view of clutch mechanism on the line B in Fig. 4; Fig. 6, a fragmentary sectional view of an eccentric for operating the mold, as on the line C in Fig. 4; Fig. 7, a fragmentary sectional view showing the eccentric in side elevation, as on the line x in Fig. 4; Fig. 8, an end elevation of the machine showing the left-hand end thereof, which receives the pallets on which the blocks are formed; Fig. 9, a fragmentary horizontal sectional view, as on the line D D in Fig. 1, showing the mold and the tamping apparatus arranged for molding curved blocks; Fig. 10, an end elevation of the machine, showing the right-hand end thereof from which the finished blocks on the pallets are removed; Fig. 11, a fragmentary horizontal sectional view, approximately on the line E E in Fig. 1, showing a top plan of the mold and a pallet forming the bottom of the mold; Fig. 12, a vertical sectional view of the machine on the line F F in Fig. 1; Fig. 13, a side elevation of a central tamping-bar; Fig. 14, a side elevation of a traveling tamping-bar; Fig. 15, a fragmentary horizontal sectional view, approximately on the line E E in Fig. 1, showing a plan of the mold in its open position; Fig. 16, a detail view of a latch for an end of the mold; Fig. 17, a fragmentary horizontal sectional view on the line G G in Fig. 1, showing the flexible frame of the tamping mechanism; Fig. 18, a fragmentary sectional view showing a pallet-rail and a lever with which the ingoing pallet engages; Fig. 19, an inverted plan of the elements shown in Fig. 18, with the difference that the lever is indicated as having been moved on its pivot and also out of the path of the pallet; Fig. 20, a fragmentary sectional view transversely of the pallet-rails showing, in side elevation, devices for automatically disengaging a clutch, whereby the mold may be closed; Fig. 21, an elevation of the features shown in Fig. 20 at right angles thereto; Fig. 22, a plan view of parts of the frame of the tamping-bars; Fig. 23, a fragmentary plan of the automatic gage-stop for the pallets; Fig. 24, a fragmentary sectional view showing in elevation automatic devices for releasing the tamping-bar frame; Fig. 25, a fragmentary sectional view of the machine-table, with which is shown in side elevation the gage-stop that appears in Fig. 23; Fig. 26, a fragmentary detail view of the strike-off blade; Fig. 27, a perspective view of a group of levers for operating and controlling the clutch mechanism that comprises parts of the automatic mechanism for operating the mold and the pallets; Fig. 28, a rear elevation of the complete machine; and Fig. 29, a fragmentary detail view showing particularly a knuckle-jointed arm of the strike-off devices.

Similar reference characters in the various figures of the drawings designate corresponding elements or features.

In constructing a machine embodying the invention a suitable main frame is provided which comprises two upright main members $a$ and $a'$, that are adapted to rest on a floor or upon timbers, a pair of transverse members $b$ and $b'$, connected to the tops of the upright members, a transverse member $c$, attached to the upper rear parts of the upright members, and such other transverse members as may be desired, which are omitted in the drawings in order to avoid obscuring other parts. A pair of tables $d$ and $d'$ are arranged a suitable distance apart and attached to the main members $a$ and $a'$ in gaps in the forward portions thereof as parts of the frame, and track-rails $e$ and $e'$, preferably composed of L-section angle-iron, are secured to the opposing edges of the tables for supporting the pallets between the tables, it being designed that the pallets shall be placed on the rails at the left-hand side of the machine and to move on the rails to the right-hand side of the machine, there to be lifted from the rails. Obviously the rails may be provided with rollers, if desired, on which the pallets may move. Otherwise the pallets will slide on the rails.

A suitable number of rectangular pallets H are provided that are adapted to fit on the rails $e$ and $e'$ between the tables $d$ and $d'$, it being designed that three pallets may rest on the rails at one time. Each pallet has a suitable number of apertures $f$, Fig. 11, through which cores may be projected from below when it may be desired to make hollow blocks. When solid blocks are to be made, the pallets obviously will not be apertured. They are all preferably composed of wood and may be suitably reinforced with metal, if desired. Each pallet is slightly larger in plan than the blocks that are to be formed thereon.

An endless belt I is arranged in a plane between the rails $e$ and $e'$ and extends parallel therewith over two wheels $g$ and $g'$, that are mounted below the ends of the tables $d$ and $d'$, one of the wheels being secured to a rotative shaft $h$ and adapted to drive the belt in the direction of the arrows thereat. The belt is preferably formed as a metallic sprocket-chain. A rotative shaft $i$ is supported by the machine-frame near an end of the table $d'$, and it is connected with the shaft $h$ by bevel-gear wheels $j$ and $j'$. A sprocket-wheel $k$ is secured to the shaft $i$ and is connected by a chain-belt $l$ with a sprocket-wheel $k'$, that is secured to a counter-shaft $m$, which is mounted in the lower rear portion of the machine-frame. Therefore when the shaft $m$ rotates the belt I will be operated. For operating the shaft $m$ periodically a gear-wheel $n$ is secured thereto that is connected by a gear-wheel $p$, which is mounted rotatively on a main shaft $q$, that is mounted in the frame parallel to the shaft $m$, the wheel $p$ being provided with clutch mechanism whereby it may be periodically locked to the shaft $q$, the latter having a pulley $r$ secured thereto to be belted to any suitable engine or drive-pulley, so that the main shaft may rotate continuously when the machine is in operation. The endless belt I is provided with a suitable number of projections $s$, that are adapted to engage the tail ends of the pallets in order to move the pallets along the track-rails $e$ and $e'$, while the belt extends beneath the pallets. It will now be apparent that a pallet may be placed upon the track-rails and be moved to a position midway between the members $a$ and $a'$ of the frame, where the pallet may be stopped, and serves as the bottom of a mold, while a stone or block may be formed.

The mold comprises in addition to the bottom a movable mold-front J, that is suitably guided and supported upon the table $d$, a movable mold-back K, that is supported upon the table $d'$, and two mold ends L and L', which are attached to the mold-back by means of hinges $t$, each mold end being connected at an end thereof to an end of the mold-back. The mold-front J includes a member $u$ or a member $u'$, Fig. 9, against which the mold ends are stopped and gaged when closed, the members being removable and of different patterns, so as to form the front faces of the blocks in various patterns. A pair of curved operating-arms M and M' are secured to the mold-front J and extend forwardly over the table $d$ and downwardly and rearwardly under the tables $d$ and $d'$, the rear ends of the arms being connected by rods $v$ to rocker-arms N and N' and also by rods $w$ to rocker-arms O and O', the rocker-arms N and N' being pivoted between their ends to the upright members $a$ and $a'$ of the frame, and the rocker-arms O and O' being secured to a rock-shaft $y$, that is mounted in the frame members $a$ and $a'$. An arm $O^2$ is secured to the rock-shaft $y$ for the operation thereof, and it is connected to a rod $z$, that is attached to a strap 40 of an eccentric P, which is mounted rotatively on the counter-shaft $m$ and secured to a gear-wheel 41 for the operation and control thereof, the gear-wheel being engaged by a gear-wheel 42, that is mounted rotatively on the main shaft $q$ and provided with clutch mechanism, so that it may be periodically locked to the main shaft and be driven thereby. It will be obvious, therefore, that when the gear-wheel 42 is in motion the mold-front J will be moved thereby through the above-described connections.

The clutch mechanism hereinbefore mentioned may be of any suitable construction, the frictional type being preferable, the essential parts of which are shown in detail in Fig. 5, there being a ring 43 attached to the wheel $p$ and a ring 44 attached to the wheel 42. Arms 45 and 46 are secured to the shaft $q$, each arm carrying a movable member 47, having a shoe 48 adapted to be forced against the ring, as 43 or 44, by a double cone-sleeve 49, that is splined on the shaft and movable along the shaft by a fork 50, so as to lock either wheel $p$ or 42 to the shaft. The fork is suitably supported movably by the frame and is connected to a bell-crank 51, that is pivoted to a part of the frame. Suitable provision, of course, will be made for normally holding the shoes 48 away from the rings 43 and 44.

The mold-back K has a guide-bar 52 rigidly attached thereto and mounted in a guide 53, that is secured to the table $d'$ for guiding the mold-back on the table, the guide also serving as a stop for the mold-back when being opened or drawn away from the operative position thereof. The mold-back includes a removable member 54, Fig. 15, or a member 55, Fig. 9, for changing the forms of the concrete blocks or varying the widths thereof and in some cases may not be used, as in Fig. 12. The mold ends L and L' each include a removable member 56, having a projection 57 for forming recesses in the ends of the concrete blocks; but when solid blocks are made these members will not be used, and plain plates without the projections may be substituted therefor, or members 58, as in Fig. 9, may be used for forming mitered ends on the blocks.

In order to move the mold-back and mold ends into and out of operative positions, a pair of arms Q and Q' are pivoted to the mold-back K at the ends thereof by means of pivot-heads 59, that are attached thereto, and connecting-rods 60 and 61 are pivoted to the arms and suitably connected to a beam 62, that is attached to the upper ends of the rocking arms N and N', so that when the rocking arms move the mold-front and the mold-back will both move simultaneously, but in opposite directions. Connecting-rods 63 for moving and controlling the mold ends are pivoted to the arms Q and Q' and have each a slot 64 therein, through which a pin extends that is secured to a suitable holder, one of which is attached to each mold end. The slot 64 permits the connecting-rod to move somewhat without moving the mold end, each one of which is provided with a latch-bolt 66, that is suitably supported slidingly by the free end of the mold end and adapted to engage the mold-front J, the latter being suitably adapted to receive the latch-bolt. A latch-rod is connected to the latch-bolt and comprises a member 67, that is pivoted to the connecting-rod 63 and has a socket 68, in which a rod 69 is movably mounted that is attached to the latch-bolt, there being a spring 70 in the socket normally pressing the rod 69 outwardly, the rod being provided with a stop-pin 71, that extends into a slot 72 in the wall of the socket, permitting the latch-bolt to be retracted when it strikes the mold-front to become latched thereto, the stop-pin also providing means whereby the latch-bolt may be unlatched by the movement of the connecting-rod 63 in advance of the movement of the mold end when the latter is to be opened.

A core-head 73 is arranged in a plane between the rails $e$ and $e'$ in vertical guides 74 and $74^a$, that are suitably mounted below the plane of the tables $d$ and $d'$, and a pair of cores 75 and $75^a$ are attached to the top of the core-head, so that the cores may be projected upwardly through the apertures $f$ of the pallets and also be withdrawn therefrom. The cores obviously may be made so as to be detachable from the core-head in order to remove them when it may be desired to mold solid blocks of concrete. The core-head, and consequently the cores, may be moved vertically by means of an arm 76, that is secured to the shaft $y$ and extends into a slot 77 in the core-head. Therefore when the shaft $y$ moves rotatively the cores will be moved simultaneously with the movements of the mold-front and the mold-back by reason of the connections between the shaft $y$ and the rocker-arms N and N'.

Tamping apparatus comprises a suitable vertically-movable frame having upright end members 78 and $78^a$, that are arranged to move in vertical guides 79 and $79^a$, which are attached to the upper portions of the frame members $a$ and $a'$, the vertically-movable frame also including horizontal members 80 and $80^a$, that are attached rigidly to the upright end members. A set of four guide-heads R R' $R^2$ $R^3$ are attached adjustably to the member 80, and four similar guide-heads $R^4$ $R^5$ $R^6$ $R^7$ are attached to the member $80^a$ below the other guide-heads and inverted with respect thereto, there being four of the guide-heads at the front and four at the rear of the members and movable toward or from them in order to serve to guide the tamping-bars and adjust them laterally when it may be desired to mold curved blocks. Also for the same purpose a set of two guide-heads S and S' are attached adjustably to the member 80, and two similar guide-heads $S^2$ and $S^3$ are attached to the member $80^a$, there being two of these guide-heads at the front and two at the rear of the members and movable toward and from them. The guide-heads, as R and $R^2$, are connected in pairs to the members, as 80 and $80^a$, so that the two guide-heads may move together, both guide-heads being secured to a screw-rod 81, that extends slidingly through the member 80 or $80^a$, securing-nuts 82 and 83 being placed on the screw-rod, one at either side of the supporting member, the nuts serving to assist in adjusting the guide-heads. The other guide-heads, as S and S', are also connected in pairs, each pair being secured to two screw-rods 84 and 84$^a$, that extend slidingly through the supporting member there being securing-nuts 82 and 83 also on these screw-rods. In case that it be desired to adjust each guide-head independently it is obvious that they may all be supported independently. The uppermost guide-heads have openings in their under sides and the lowermost ones have openings in the upper sides thereof, and in each guide-head opening a pair of opposing guide-rolls 85 and 85$^a$ are mounted therein, as appears particularly in Fig. 17. A flexible frame is mounted in the guide-heads above described for directly guiding a group of the tamping-bars in their vertical movements and also for moving the group laterally while in operation, the flexible frame comprising a pair of flexible and preferably elastic guide-bars T and T' and a similar pair of guide-bars T$^2$ and T$^3$ above the others, all guided laterally by the guide-rolls 85 and 85$^a$, the lowermost guide-bars being supported by the lowermost guide-heads and all of the guide-bars being movable longitudinally and capable of being curved laterally on horizontal planes. The uppermost guide-bars are flexibly connected to posts U U' U$^2$ U$^3$, which are flexibly connected to the lowermost guide-bars, the posts being attached to cross-bars V V' V$^2$ V$^3$, that extend across the opposing horizontal faces of the members 80 and 80$^a$, there being longitudinal bars 86 and 86$^a$ rigidly attached to the cross-bars, so that the cross-bars, the longitudinal bars, and the posts together form a cross-head that is arranged in guides 87 and 87$^a$, which are attached to the members 80 and 80$^a$, the cross-head being designed to move the guide-bars longitudinally by means of the flexible connections, each of which comprises an arm 88, connected by a pivot 89 to a post of the cross-head and also connected by a pivot 90 to a guide-bar, (see Figs. 17 and 22,) the pivot 90 being attached to a support 91, that is suitably attached adjustably to the guide-bar. The guide-bars, as T, are each provided with a suitable number of guide-bearings 92, in which traveling tamping-bars W are guided, the latter having each a yoke 93, in which an eccentric may operate to actuate the tamping-bar. Other tamping-bars W', which are connected together, extend through and are guided by the members 80 and 80$^a$ of the movable frame that carries the tamping apparatus, these tamping-bars having each a yoke 93$^a$. Two rotative shafts X and X' are mounted in the posts of the cross-head and are connected operatively together by a sprocket-chain 94, there being sprocket-wheels on the shafts for the purpose. The shaft X' has an extension shaft X$^2$ at one end thereof, that is mounted so that it may move endwise in a housing 95, which is stationary, the shaft and its extension being preferably connected together by a universal coupling, so as to permit lateral vibrations of the shaft with the cross-head. The shaft X$^2$ has a sprocket-wheel 96 splined thereon in the housing 95, so that the housing guides the sprocket-wheel, while the shaft may slide through the wheel. A rotative shaft Y is mounted in the upright members 78 and 78$^a$ and is provided with a sprocket-wheel 97. The rotative shafts X, X', and Y are each provided with eccentrics Z, that are secured thereto and fit into the yokes of the tamping-bars for the operation thereof. The arrangement of the eccentrics on the shafts is such that some of the tamping-bars may be forced downwardly when others ascend. A rotative shaft 98 is mounted in the upper rear portion of the main frame and has a sprocket-wheel 99 secured thereto, a chain belt 100 extending about the wheels 96, 97, and 99 for driving the shafts that are provided with the eccentrics. The shaft 98 is connected with the main shaft $q$ to be driven thereby by a belt 101 and pulleys on the shafts.

In order to move the tamping-bars laterally, so as to thoroughly tamp the plastic material, suitable gearing is provided comprising a small gear-wheel 102, that is secured to the shaft Y, a relatively larger connecting gear-wheel 103, secured to a shaft 104, that is mounted on a vertically-movable frame member 80, a relatively smaller gear-wheel 105, which is secured to the shaft 104, a relatively larger connecting gear-wheel 106, having a bevel gear-wheel 107, secured thereto and mounted rotatively on the shaft Y, and a connecting bevel gear-wheel 108, secured to a vertical shaft 109, that is mounted rotatively in the vertically-movable frame and provided with a crank 110, to which a connecting-rod 111 is pivotally attached and also connected to the member V$^3$ of the cross-head.

The vertically-movable frame in which the tamping apparatus is mounted is provided with a controlling handle or lever 112, that is supported on a shaft 113, which is mounted in bearings 114, that are attached to the top of the main frame members, the lever having a counterbalance-weight 115 for assisting in elevating the tamping apparatus, the weight, however, permitting the apparatus to descend slowly. The vertically-movable frame may be held in an elevated position by a latch 116, that is pivoted to the frame member $a$, (see Fig. 24) and spring-pressed against the end member 78, so as to be pushed under it when the member is elevated, the latch having an arm 117 for its release, contacting with a stop 118 when the latch is supporting the frame. The mold-front J has an arm 119 secured thereto that supports a spring-finger 120, which is adapted to engage the end of the arm 117 to release the latch 116, the spring-finger having an end adapted to engage a fixed projection 121 and be deflected thereby away from the arm 117, after the latch releases the vertically-movable frame, so that the mold-front may move farther to its operative position and leave the latch set for action when the frame again rises.

A strike-off blade 122 is pivotally attached to a bar 123, which is attached to arms 124 and 124ª, that are pivoted to the frame members $a$ and $a'$, suitable means being provided for preventing the edge of the blade from descending below the top of the mold when not in contact therewith. A handle 125 is connected with the bar 123 for operating the blade and extends to the front of the machine, normally resting on the mold-front J. The arm 124ª has a finger 126, (see Fig. 29,) that is connected thereto by a knuckle-joint 127 and spring-pressed in one direction, the finger being designed to move a lever 128, that is pivoted between its ends to the member $a'$ of the main frame, there being a connecting-rod 129 pivoted to an end of the lever 128 for shifting the clutch-cone.

In order to conveniently connect a number of devices with the bell-crank lever 51 for its operation, a bracket 130 (see particularly Fig. 27) is secured to the member $a'$ of the main frame and supports a rock-shaft 131, to which are attached arms 132, 133, 134, 135, and 136, and a connecting-rod 137 is pivoted to the arm 133 and also to the lever 51, so that when motion is given to either one of the arms on the rock-shaft 131 the cone-sleeve 49 will be shifted. A bell-crank 138 is mounted also on the member $a'$ and has one of its arms connected to the rod 129, the other arm of the bell-crank being connected by a rod 139 with the arm 132, so that by means of the handle 125 and the connections above described the clutch mechanism may be put in operation so as to put the eccentric P in motion to open the mold in order to remove the finished concrete block.

When the mold is thrown open, the pallet H will be automatically conveyed, with the molded block thereon, to the right-hand side of the machine, the automatic features comprising a knuckle-jointed arm 140, that is pivoted between its ends on the table $d'$, the arm being constructed somewhat like the arm 124ª above described, there being a rod 141 connected to the arm 140 and also to the arm 134. The jointed end of the arm 140 is in the path of the mold end L', so as to be engaged thereby when the mold is thrown open in order to disconnect the cone-sleeve 49 from the gear-wheel 42 and push it into connection with the gear-wheel $p$, so that the belt I may be put in motion to move the pallet.

A bell-crank lever 142 is mounted under the table $d'$ and has an arm extending upwardly above the plane of the rail $e'$, so as to be engaged by the forward end of an incoming pallet. (See Figs. 18 and 19 for details.) A spring 143 on the pivot of the bell-crank lever normally holds the latter up, so that the arm may be in the path of the pallet. An inclined block 144 is attached to the under side of the table $d'$ to force the bell-crank down below the path of the pallet when moved a suitable distance on its pivot by the pallet. A connecting-rod 145 is pivoted to the bell-crank lever and also to the arm 135 for shifting the clutch mechanism. The operation of the lever 142 by the pallet will disconnect the clutch-cone 49 from the gear-wheel $p$ to stop the motion of the belt I and the pallets thereon and will connect the cone with the gear-wheel 42 to close the mold.

In order to insure the accurate placing of the pallets in proper position, so that the apertures in the pallets will receive the cores, a movable gage-stop 146 is mounted in the path of the pallet and spring-pressed upwardly, so as to be engaged by the forward end of the pallet after the lever 142 may have been operated, (see Figs. 23 and 25 for details,) the gage-stop being arranged in a suitable guide, so as to descend to permit the pallet to advance at the proper moment, a housing 147 being secured to the table $d$ and supporting the guide and operating devices of the gage-stop. A bell-crank lever 148 is pivoted to the housing and is operatively connected with the gage-stop for depressing the same, and a swinging lever 149 is pivoted so as to swing to or from an arm of the lever 148 and so as to extend through the table $d$ to be engaged by the mold-front J in its passage to and fro on the table. The gage-stop when depressed is held by a latch 150, that enters a recess 151, the latch-handle extending nearly to the belt I, so as to be engaged by fingers 152, that are attached to the belt. When the mold opens, the gage-stop will be depressed, so that the full pallet may advance and will be released in time to stop the following pallet.

For the purpose of disconnecting the cone-sleeve 49 from the gear-wheel 42 after the closing of the mold and to hold the cone-sleeve centrally against accidental connection with either of the gear-wheels $p$ or 42 during the formation of the concrete block a bar 153 is mounted slidingly in a housing 154 beneath the tables $d$ and $d'$ and is normally held in mid-position by suitable springs 155 and 156, there being a shallow notch 157 in the under side of the bar, into which may enter an end of a gravity-pawl 158 when the bar is pushed forcibly against the spring 155, as seen in Figs. 20 and 21. The core-head 73 is provided with a projection 159, that may engage the pawl at the moment that the mold is closed and the cores elevated, in order to release the bar 153, which is connected by a rod 160 with the arm 136 for stopping the motion of the eccentric P through the clutch mechanism.

In some cases the machine may be designed to make only rectangular blocks, in which event the guide-bars, as T, need not be flexible, and no flexible connection therefore will be required between them and the crosshead that moves them longitudinally. Other modifications may also be made, particularly in respect to the clutch mechanism and the automatic connections for the operation and control thereof.

In practical use the machine will be fed with the plastic material from a suitable hopper and spout and controlled by an attendant or by automatic means, as may be desired. The main shaft $q$ should be put in motion and the mold closed on a pallet to receive the plastic material, the tamping-bars being elevated and in continual motion vertically, the tamping-bars W being moved also laterally. While the mold is being filled, the tamping-bars will gradually raise the frame in which they are mounted, and when the mold is filled the attendant should elevate the frame and tamping apparatus by means of the handle 112 and allow it to be held up by the latch 116. An empty pallet should be placed on the rails $e$ $e'$. Then the attendant may draw the handle 125 forward and strike off the surplus material by the blade 122 and then push the blade back to its normal position, in which act the arm 124$^a$ will move the lower end of the lever 128 forwardly and through the intermediate connections cause the cone-sleeve 49 to connect the gear-wheel 42 with the main shaft $q$, so that the eccentric P will be put in motion and move one-half of a revolution and open the mold. The mold end L' in swinging open will engage the arm 140, and thereby shift the cone-sleeve 49 from the gear-wheel 42 to a connection with the gear-wheel $p$, and thereby start the countershaft $m$, whereby the belt I will be put in motion through the intermediate connections and will move the full pallet to the right-hand side and also move the empty pallet to the position that had been occupied by the full pallet. During the opening movements of the mold the mold-front J will engage the lever 149 and cause the gage-stop 146 to be depressed, so as to become latched. Then while the belt I moves the pallets a projection 152 will engage the latch 150 and release the gage-stop. Also while the mold is opening the core-head 73 will descend and permit the pawl 158 to contact with the bar 153 ready to enter the notch 157 therein when the bar moves rearwardly. The advancing empty pallet will engage the lever 142, and thereby through its connections shift the connection of the cone-sleeve 49 from the gear-wheel 42 to the gear-wheel $p$, so as to set in motion the eccentric P, which will move one-half of a revolution and close the mold and then be stopped by reason of the projection 159 engaging the pawl 158, so as to release the bar 153 (which had become latched) and permit the spring 155 to push the bar into mid-position against the spring 156, thus holding the cone-sleeve 49 in mid-position. During the closing of the mold the mold-front J will carry the catch 120 against the arm of the latch 116 and release the vertically-movable frame and permit it to lower the tamping-bars to repeat the molding operation, as before. Each pallet when moved into position at the mold will push the lever 142 far enough to cause the lever to be depressed below the bottom plane of the pallet, and then the pallet will be stopped positively by the gage-stop 146, the belt I being stopped by the pallet. The automatic processes will thus be carried on each time the attendant operates the strike-off blade 122.

If desired, the strike off blade may be provided with devices for the automatic operation thereof, and also mechanism may be provided for automatically elevating the tamping apparatus, so that the machine may be caused to operate continuously in an automatic manner.

Having thus described the invention, what is claimed as new is—

1. A machine including a mold, a strike-off device, and mechanism set in motion by the strike-off device for automatically discharging the product of the mold.

2. A machine including a mold, a strike-off device, and mechanism set in motion by the strike-off device for automatically discharging the product of the mold and resetting the mold for further use.

3. A machine provided with a plurality of movable tamping-bars of which a number must advance while a number recede, a sectional mold in which the tamping-bars may operate and having a removable bottom, guides for the bottom, a stop-gage for the bottom, and means for actuating the tamping-bars.

4. A machine provided with a mold including a movable mold-bottom, a mold-front and a mold-back movable in opposite directions, a pair of mold ends hinged to the mold-back, connections between the mold-front and mold-back and the pair of mold ends for opening the mold, and means for automatically moving the mold-bottom when the mold is opened.

5. A machine including a mold having movable parts, a plurality of pallets either one of which serves as a mold-bottom, automatic mechanism for moving a pallet into and out of position as a mold-bottom, connections between the movable parts of the mold and the automatic mechanism, tamping-bars movable into and out of the mold, and operating mechanism for the tamping-bars.

6. A machine including a mold having movable parts, a movable core, connections between the core and the movable parts of the mold, a movable pallet having an aperture therein to receive the core, track-rails for supporting the pallet, a belt for moving the pallet, means for moving the belt, and means for moving the parts of the mold and also the core controlled by the moving pallet.

7. A machine including a mold comprising a movable mold-bottom, a mold-front and a mold-back movable away from the mold-bottom, mold ends movable away from the mold-bottom, connections between the mold-front and mold-back and mold ends for the simultaneous operation thereof, and movable means for moving the mold-bottom put in motion by a part of the mold or connection thereof when the mold parts are moved away from the mold-bottom.

8. A machine including a pair of tables, a mold-bottom movable between the tables, a mold-front movable on one of the tables, a mold-back movable on the other one of the tables, a pair of mold ends hinged to the mold-back, mechanism for moving the mold-front and the mold-back in opposite directions on the tables, connections between the mechanism and the mold ends for the movement of the mold ends simultaneously with the movements of the mold-front and the mold-back, and means for moving the mold-bottom between the tables.

9. A machine including a mold, tamping apparatus comprising a plurality of tamping-bars movable vertically, means for moving the plurality of tamping-bars laterally, means for operating the tamping-bars individually in vertical directions, and means for moving the plurality of tamping-bars collectively into and out of the mold.

10. A machine including a mold, a vertically-movable frame, a cross-head movable horizontally in the vertically-movable frame, a plurality of tamping-bars movable vertically in the cross-head, means for operating the tamping-bars in the mold in vertical directions, and means for moving the cross-head horizontally while the tamping-bars operate vertically.

11. A machine including a mold, a vertically-movable frame provided with guides, a rotative shaft mounted in the frame and provided with a plurality of eccentrics set at different angles relatively, a plurality of vertical tamping-bars mounted in the guides of the frame and having yokes embracing the eccentrics to be moved thereby into the mold, and means for rotating the shaft and eccentrics and thereby operating the tamping-bars, the tamping-bars being weighted by the vertically-movable frame when in operation in the mold.

12. A machine including a mold, a vertically-movable frame provided with adjustable guides, laterally-flexible guide-bars movable longitudinally in the guides above the mold and provided with guide-bearings, a traveling cross-head mounted in the vertically-movable frame and connected with the laterally-flexible guide-bars for the operation thereof, means for operating the cross-head, tamping-bars mounted in the guide-bearings, means for operating the guide-bars, and means for adjusting and holding the adjustable guides and thereby flexing the laterally-flexible guide-bars.

13. A machine including a mold, a vertically-movable frame provided with curved guide-bars extending horizontally above the mold, a plurality of vertically-movable tamping-bars guided vertically and also in lateral directions by the curved guide-bars, means for operating the tamping-bars vertically, means for moving the tamping-bars laterally while operating vertically, and means for controlling the vertically-movable frame.

14. A machine including a mold, a vertically-movable frame provided with horizontal guides above the mold, a cross-head mounted in the frame and movable in the horizontal guides thereof, means for moving the cross-head to and fro, a plurality of guides adjustably supported by the frame, a plurality of curved guide-bars movable longitudinally in the guides and each provided with a plurality of guide-bearings, flexible connections between the guide-bars and the cross-head for the operation of the guide-bars, a plurality of tamping-bars mounted in the guide-bearings and operative vertically, and means for operating the guide-bars.

15. A machine including a pair of track-rails, pallets fitting on the track-rails to be moved thereon, a movable endless belt having a plurality of projections for engaging and moving the pallets, a mold to coöperate with the pallets one at a time, driving means for the belt, and a device mounted in the path of the pallets to be operated thereby for stopping the motion of the driving means when a pallet is moved to the mold.

16. A machine including a pair of track-rails, pallets fitting on the track-rails to be moved thereon, a movable endless belt having a plurality of projections for engaging and moving the pallets, a mold to coöperate with the pallets one at a time, driving means for the belt, a device mounted in the path of the pallets to be operated thereby for stopping the motion of the driving means when a pallet is moved to the mold, a gage-stop movable into and out of the path of the pallets for gaging the position thereof at the mold, means for temporarily holding the gage-stop in the path of a pallet, means for moving the gage-stop out of the path of the pallets, and means for again moving the gage-stop into the path of the pallets after one pallet has proceeded before a second pallet advances thereto.

17. A machine including a mold for shaping plastic material and comprising movable sections, actuating mechanism for separating the sections of the mold, connecting apparatus for starting the actuating mechanism, a strike-off device for advancing upon the mold to remove the surplus plastic material therefrom, and means operatively connected with the strike-off device during retraction thereof for moving the connecting apparatus to start the actuating mechanism.

18. A machine including a movable pallet having an aperture therein and forming a mold-bottom, a mold comprising movable sections, a pivoted rocker-arm connected with the sections of the mold and coöperating to move all of the sections simultaneously, a rock-shaft having a plurality of arms, connections between one of the arms of the rock-shaft and the rocker-arm, a core supported by another one of the arms of the rock-shaft and movable into and out of the aperture of the pallet, eccentric mechanism for actuating the rock-shaft and the rocker-arm, driving means, means for connecting the eccentric mechanism with the driving means, and automatic means for disconnecting the eccentric mechanism from the driving means coincident with the movement of the core into the aperture of the pallet.

19. A machine including a mold composed of movable sections, an endless belt for moving the bottom section of the mold, eccentric mechanism for moving the remaining sections of the mold, means for intermittently driving the belt and controlled automatically, means controlled automatically controlling the starting and stopping of the eccentric mechanism, guides for the movable sections of the mold, a plurality of vertically-movable tamping-bars, a plurality of vertically and laterally movable tamping-bars, means for moving the tamping-bars operatively, and a strike-off device coöperating to start the automatic means that control the movements of the sections of the mold.

20. In a molding-machine, the combination of a frame having a fixed horizontal guide, a movable mold-back guided by the horizontal guide and having a pair of arms pivoted thereto, and a pair of mold ends hinged to the mold-back and having connecting-rods connected therewith and also to the arms of the mold-back, with means for moving the arms, a movable mold-front, and a movable mold-bottom.

21. In a molding-machine, the combination of a pair of tables, a mold-front movable on one of the tables, a mold-back movable on the other one of the tables, a movable mold-bottom, mold ends hinged to the mold-back and carried thereby, curved face-plates attached to the mold-front and the mold-back, operating connections between the mold-front and the mold-back, and rods connecting the mold ends with the operating connections, with means for actuating the operating connections, and means for moving the mold-bottom.

22. In a molding-machine, the combination of a plurality of pallets having apertures therein, track-rails to support the pallets, a movable belt for moving the pallets on the track-rails to a predetermined position one at a time, a core movable through the apertures of the pallets when in the predetermined position, and a mold having sections movable to or from the positioned pallets, with means for advancing and retracting the core, means for actuating the belt, and means for moving the sections of the mold.

23. In a molding-machine, the combination of a mold consisting of movable sections, operating devices connecting with a plurality of the movable sections of the mold, and an eccentric operatively connected with the operating devices, with means, for periodically actuating the eccentric.

24. In a molding-machine, the combination of a sectional mold comprising a movable bottom, a movable mold-front, a movable mold-back, and movable mold ends; a pair of rocker-arms pivoted between their ends and having connections with the different movable parts of the sectional mold; and a track for the movable bottom.

25. In a molding-machine, the combination of a main frame, a mold, tamping apparatus arranged above the mold and comprising a vertically-movable frame, tamping-bars guided by the vertically-movable frame, a cross-head movable horizontally in the vertically-movable frame, tamping-bars guided vertically by the cross-head and movable thereby laterally, and a handle mounted on the main frame and connected with the vertically-movable frame, with means for operating the tamping-bars vertically, and means for moving the cross-head horizontally.

26. In a molding-machine, the combination of a track, a mold-bottom movable on the track, a stop-gage for the mold-bottom, a mold-front and a mold-back movable in opposite directions, a pair of mold ends mounted on pivots, means connected with the mold-front and mold-back for the simultaneous operation thereof, and means connected with the pair of mold ends for the simultaneous operation thereof.

27. In a molding-machine, the combination of a mold having movable side and end parts, means for simultaneously moving the side and end parts and connected therewith, a plurality of pallets either one of which serves as a mold-bottom, a pair of track-rails for the pallets, a pair of rotative sprocket-wheels, a sprocket-chain mounted on the sprocket-wheels and having projections for engaging and moving the pallets on the track-rails, and means for actuating the sprocket-chain.

28. In a molding-machine, the combination of a mold having movable side and end parts, a movable core, a movable pallet having an aperture therein to receive the core, a track for the pallet, a stop-gage for the pallet, a belt provided with means for moving the pallet, means for moving the belt, means for moving the side and end parts, and means for moving the core.

29. In a molding-machine, the combination of a mold having movable side and end parts, a movable core, a movable pallet having an aperture therein to receive the core, a track for the pallet, a periodically-movable device provided with means for moving the pallet and provided with operating and stopping mechanism, and operating mechanism connected with the movable side and end parts and also with the core for simultaneous operations thereof.

30. In a molding-machine, the combination of driving mechanism, a track, a mold-bottom movable on the track, means connected detachably with the driving mechanism and provided with means for moving the mold-bottom on the track, movable mold sides and ends operatively connected detachably with the driving mechanism, a gang of tamping-bars movable longitudinally and laterally, and means connected with the tamping-bars for the operation thereof and provided with connections to be actuated by the driving mechanism.

31. In a molding-machine, the combination of a mold comprising movable sections, a track, a pallet movable on the track, a vertically-movable frame provided with a latch for the support thereof, a plurality of tamping-bars mounted on the frame, means for operating the tamping-bars, means for moving the sections, means for moving the pallet, and automatic mechanism for releasing the latch from the frame.

32. In a molding-machine, the combination of a main frame, a mold, tamping apparatus arranged in the main frame above the mold and comprising a vertically-movable frame having guides mounted adjustably thereon, tamping-bars mounted in the guides, means for operating the tamping-bars, and a counterbalance for the vertically-movable frame and apparatus thereon.

33. In a molding-machine, the combination of a mold having movable parts, a driving-gear provided with a clutch device, means connected with the clutch device for actuating the movable parts of the mold and comprising apparatus for moving the bottom of the mold, and apparatus for independently moving the sides and ends of the mold.

In testimony whereof we affix our signatures in presence of two witnesses.

ATHOS C. KYNETT.
EMORY D. TOOPS.

Witnesses:
WM. H. PAYNE,
E. T. SILVIUS.